(12) United States Patent
Mueller et al.

(10) Patent No.: US 11,474,675 B2
(45) Date of Patent: Oct. 18, 2022

(54) SYSTEMS AND METHODS FOR VIRTUALLY CONTROLLING DEVICES

(71) Applicant: Digital Control Systems, Inc., Beaverton, OR (US)

(72) Inventors: Michael Mueller, Portland, OR (US); David Corrigan, Portland, OR (US); Rob Johnson, Portland, OR (US); Grayson Silaski, Portland, OR (US)

( * ) Notice: Subject to any disclaimer, the term of this patent is extended or adjusted under 35 U.S.C. 154(b) by 0 days.

(21) Appl. No.: 17/177,125

(22) Filed: Feb. 16, 2021

(65) Prior Publication Data
US 2021/0255749 A1    Aug. 19, 2021

Related U.S. Application Data

(60) Provisional application No. 62/977,385, filed on Feb. 16, 2020.

(51) Int. Cl.
*G06F 3/0484* (2022.01)
*H04B 5/00* (2006.01)

(52) U.S. Cl.
CPC ......... *G06F 3/0484* (2013.01); *H04B 5/0031* (2013.01); *H04B 5/0062* (2013.01)

(58) Field of Classification Search
CPC ... G06F 3/0484; H04B 5/0031; H04B 5/0062; H04W 4/80
See application file for complete search history.

(56) References Cited

U.S. PATENT DOCUMENTS

| | | | |
|---|---|---|---|
| 2012/0315848 A1* | 12/2012 | Smith | H04B 5/0031 455/41.1 |
| 2016/0050037 A1* | 2/2016 | Webb | G08B 27/005 455/3.01 |
| 2016/0138821 A1 | 5/2016 | Shaull et al. | |
| 2019/0222265 A1* | 7/2019 | Rumler | H04W 52/0229 |
| 2019/0306020 A1* | 10/2019 | Corbett | H04L 12/10 |
| 2019/0331702 A1* | 10/2019 | Menhardt | G16H 10/40 |

OTHER PUBLICATIONS

International Search Report and Written Opinion, International Application No. PCT/US2021/018255, 13 pages, dated May 21, 2021.

* cited by examiner

*Primary Examiner* — Mark W Regn
(74) *Attorney, Agent, or Firm* — Klarquist Sparkman, LLP

(57) ABSTRACT

Technologies are disclosed for providing a virtual control panel for a controlled device using a controller connected to the controlled device via a near-field communications (NFC) connection. The controlled device may include a transfer memory that is connected to a wireless (NFC) port and a wired port, the wired port being coupled to other internal memory of the controlled device. The controlled device may write parameter data to the transfer memory via the wired port, which is later transmitted to the controller via the NFC connection for presentation via a user interface. The controller may receive (e.g., while the controller is connected or disconnected from the controlled device) adjustments to configurable parameters of the parameter data and transmit the adjustments to the transfer memory via the wireless port for updating the internal memory of the controlled device and thereby adjusting operation of the controlled device.

18 Claims, 8 Drawing Sheets

SYSTEMS AND METHODS FOR VIRTUALLY CONTROLLING DEVICES

CROSS-REFERENCE TO RELATED APPLICATION

This application claims the benefit of U.S. Provisional Patent Application No. 62/977,385 filed on Feb. 16, 2020, which is hereby incorporated by reference.

BACKGROUND

Near-Field Communications (NFC) may be used in applications such as credit card processing and card reading, in which a device/object to be read (e.g., a credit card, ID card, etc.) is brought into close proximity with a reader device (e.g., a card reader) in order to facilitate the transfer of data via a wireless communication link. NFC is defined for communication over very short distances, typically 1.5 inches or less.

SUMMARY

The disclosure describes systems and methods for controlling devices using Near-Field Communications (NFC). For example, a near-field communication channel may be established between a controller device and a controlled device and used to create a virtual control mechanism for the operation of the controlled device. In an example of a controlled device, the controlled device may include a virtual control module including a wireless port configured for near-field communications (NFC), a wired port, and a transfer memory configured to store data communicated between the controlled device and a controller connected via the wireless port, a processor, and internal memory configured to store parameter data including one or more configurable parameters and current status or measurement data associated with the controlled device, the internal memory further configured to store instructions executable by the processor to connect to the wired port of the virtual control module, read data in the transfer memory, determine whether the data in the transfer memory includes changes to at least one of the configurable parameters received from the controller via the wireless port using an NFC connection and, responsive to determining that the transfer memory includes changes to at least one of the configurable parameters, updating the parameter data stored in the internal memory by adjusting the corresponding at least one configurable parameter according to the changes, write the updated parameter data to the transfer memory, and update operation of the controlled device corresponding to the changes to the at least one configurable parameter.

In an example of a controller for providing a virtual control panel for a controlled device, the controller may include a near-field communications (NFC) interface, one or more user interface devices, and one or more computer-readable media comprising computer-executable instructions that, when executed by the processing device, cause the controller to connect to a wireless port of the controlled device via an NFC connection established by the NFC interface, receive parameter data from a transfer memory of the controlled device via the NFC connection, determine whether the received parameter data is different from any corresponding controller-stored parameter data for the controlled device, and, responsive to determining that the received parameter data is different, store the received parameter data and update a user interface to present an indication of the received parameters, determine that user input to the user interface is received via the one or more user interface devices, the user input adjusting the parameter data, and, responsive to determining that the user input is received, store the adjusted parameter data and transmit the adjusted parameter data to the controlled device via the NFC interface to change one or more corresponding operating parameters of the controlled device, and disconnect from the controlled device by releasing the wireless port of the controlled device.

DETAILED DESCRIPTION

Introduction

Figure 1:
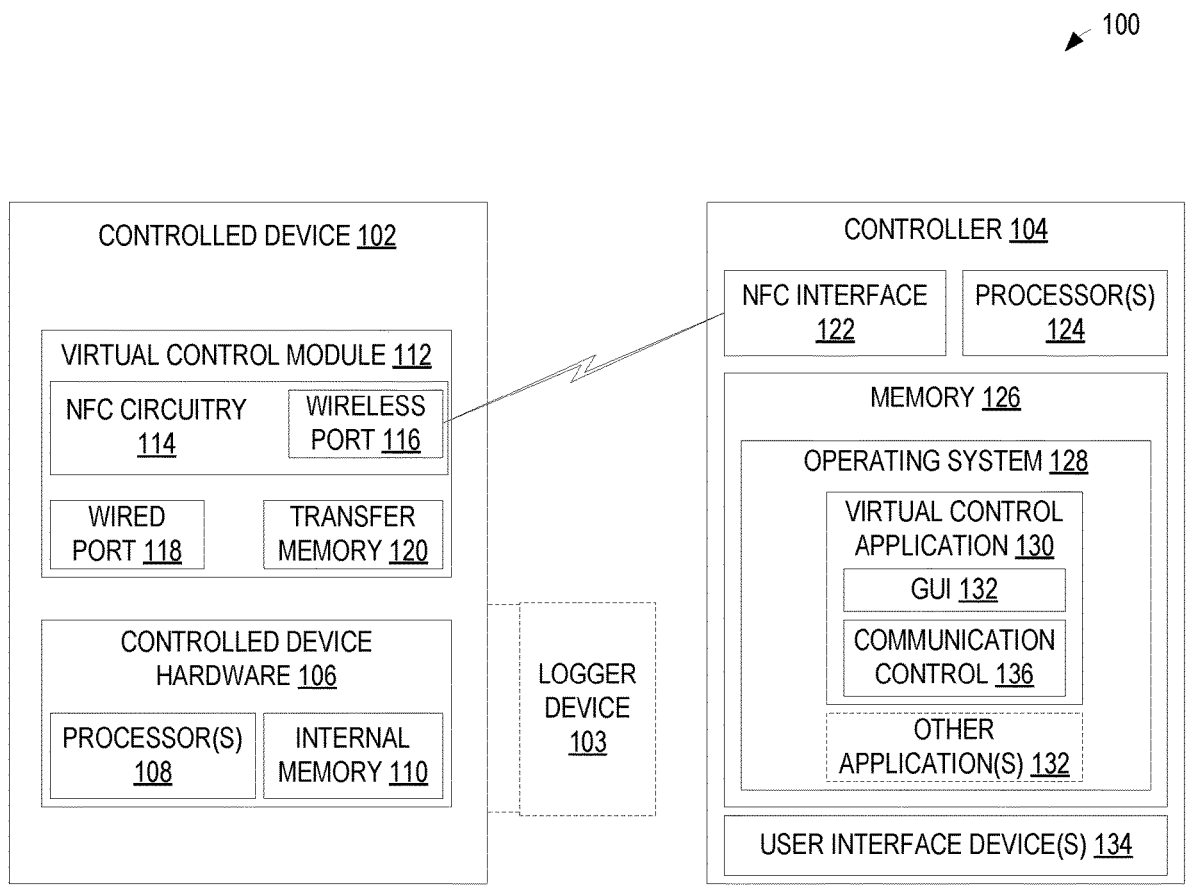
FIG. 1 shows an example virtual control environment including a controlled device and a controller.

In some Near-Field Communications (NFC) applications, an NFC link is established between a passive device (e.g., a card with data hard-coded thereon) and an active device (e.g., a card reader) in order to transfer data unidirectionally from the passive device to the active device. For example, NFC may be used for brief inter-device communication such as credit card authentication, inventory tagging, and bus passes. The NFC protocols may provide for advantages relating to the proximity requirements for connecting devices, such as increased security and simple/low-power interfacing relative to other wireless protocols. In order to extend the functionality of devices that utilize NFC, other applications use an NFC communication link as a bootstrap to other wireless protocols, such as Wi-Fi or cellular communication technologies.

The present disclosure provides systems and methods that utilize a bidirectional NFC link to remotely control a first (controlled) device with a second (controller) device without using other communications infrastructures, such as Wi-Fi or cellular communications. In this way, the controller, such as a mobile phone or other portable device, may be used as a virtual control panel for a controlled device, maintaining the security and other advantages of the NFC protocol while allowing for increased functionality relative to other NFC applications. The use of the described virtual controller may also increase the security of the controlled device and/or decrease the complexity of the controlled device by replacing the functionality that a local control panel (e.g., mounted on the controlled device) would otherwise provide, allowing such a local control panel to be absent from the controlled device.

In order to accommodate the bidirectional communication link and real-time remote control mechanisms, examples in the present disclosure include a two port memory that is integrated into a controlled device for managing data exchange between the controller and the controlled device. In operation, a user may tap or otherwise bring a controller into close proximity (e.g., within NFC communications range) of the controlled device in order to establish a communication link and transfer data between the two port memory on the controlled device and the controller. The controller may be configured to present a graphical user interface reflecting operational settings or other configuration data from the controlled device based on the data received from the two port memory. In this way, a user may view settings and/or a status of the controlled device, even after moving away from the controlled device.

The graphical user interface of the controller may further provide interface mechanisms to allow the user to adjust settings and/or otherwise define control instructions for controlling the controlled device, using the input devices available on the controller. For example, in examples where the controller is a mobile phone, the user may provide input via a touch screen of the mobile phone to define settings for the controlled device. If changes have been made to the settings for the controlled device via the controller, then the controller will transfer those changed settings to the two port memory automatically when next tapped or otherwise brought into NFC communications range of the controlled device.

The NFC-based control technologies described herein may be used in many different applications, a non-limiting example of which is thermostats in the HVAC trade, where it is advantageous that devices' controls not be accessible to the unauthorized. In other approaches, the security of devices may be controlled by hiding controls inside an enclosure of a device. However, such approaches increase the difficulty of controlling the device and accessing real-time readings from the device. The disclosed virtual control systems and methods may be used to enhance the security of controlled devices while maintaining ease of access to real-time data and controls for the controlled devices. Other example scenarios and detailed configurations are described below.

EXAMPLES

FIG. 1 is a block diagram schematically showing an example virtual control system 100 including a controlled device 102 and a controller 104. The controlled device 102 and controller 104 may be configured to exchange parameter data (e.g., readings from the controlled device and settings for adjusting operation of the controlled device). For example, the controller 104 may be configured to interface with the controlled device 102 in order to extract parameter data including readings (e.g., current status, settings, and/or other data generated by and/or stored at the controlled device) for presentation (e.g., display) to a user. The controller 104 may be further configured to accept user input of parameter data that includes and/or indicates settings to control the controlled device 102 and transfer these settings to the controlled device 102 in order to change the operation of the controlled device 102 (e.g., by adjusting current settings in accordance with the input settings from the controller and/or otherwise controlling the controlled device). As described above, the readings may be generated at the controlled device and may indicate measurements, status information (e.g., indicating one or more operating states of the device), and/or device information (e.g., device identifier, calibration data and/or other data set at time of manufacture, etc.). In some examples, the readings (e.g., the status information) may include reflected settings from the controller. For example, once the operation of the controlled device is adjusted in accordance with input settings from the controller, a subsequent reading from the controlled device may include an indication of current settings, which correspond to the prior-input settings from the controller.

As described in more detail below, the controlled device 102 and the controller 104 may only connect (e.g., and transfer data) via an NFC connection and may be physically separate and distinct devices (e.g., which may come into contact with one another when establishing an NFC connection). For example, the controlled device may not include any wireless communication capabilities other than NFC circuitry (described in more detail below) and thus may not be capable of communicating via other wireless protocols (e.g., Wi-Fi, cellular communications, etc.).

The controlled device 102 may include any device that is capable of being controlled remotely. In one non-limiting example, the controlled device 102 may be a thermostat for an HVAC system that measures and/or reports a temperature reading and that uses temperature settings and/or other parameters to control operations of a connected HVAC unit. The controlled device 102 includes controlled device hardware 106, including one or more processors 108 and an internal memory 110. The internal memory 110 may store operating parameters that control operation of the controlled device 102, status information (e.g., a current reading of a sensor, such as a temperature sensor of a thermostat, a state of operation of the controlled device, and/or other data), and/or instructions that are executable by the processor to control operation of the controlled device.

The controlled device 102 further includes a virtual control module 112 that enables the controlled device 102 to be remotely controlled via controller 104, such that the controller provides a virtual control panel for the controlled device. The virtual control module 112 includes NFC circuitry 114, which operates with a wireless port 116 to enable the controlled device 102 to establish NFC links and communicate over the NFC links. In this way, the NFC circuitry 114 (including the wireless port 116) may encompass a hardware NFC interface and software or firmware usable to control operations of the NFC interface. It is to be understood that in some examples, the internal memory 110 may include instructions executable by the processors 108 to control NFC communications using the NFC circuitry.

The virtual control module 112 further includes a wired port 118 and a transfer memory 120. The wired port 118 may couple the virtual control module (and the transfer memory 120) to the other components of the controlled device, such as the internal memory 110. In this way, at least a portion of the data from the internal memory 110 may be read into (e.g., stored on) the transfer memory 120 and/or at least a portion of the data from the transfer memory 120 may be read into the internal memory 110 via the wired port 118. For example, the controlled device hardware 106 may be configured to read the transfer memory 120 (via the wired port) at regular intervals (e.g., once every few seconds) and/or responsive to a triggering event (e.g., a detection of a communication with the controller 104). Additionally or alternatively, the controlled device hardware 106 may be configured to write to the transfer memory 120 (via the wired port) at regular intervals (e.g., once every few seconds) and/or responsive to a triggering event (e.g., an update of a parameter, status, etc.).

The reading and writing of the transfer memory 120 may be coordinated to ensure the transfer memory and the internal memory each hold the latest data. As one example, registers/locations of the transfer memory may be selectively set as read-only or write-only (by the controlled device) based on the type of data stored in the registers/locations. For example, registers designated to hold status data of the controlled device may be configured as write-only (for the controlled device; it may be read-only for the controller), so that the internal memory 110 does not inadvertently replace its latest status with a prior-reported status. Registers designated to hold controllable parameter data of the controlled device (e.g., operational settings that may be controlled by the controller) may be configured as read-only (for the controlled device; it may be write-only for the controller), so that the internal memory 110 does not inadvertently replace a recently-updated control parameter with a prior-set parameter. In additional or alternative examples, the virtual control module 112 may be configured to periodically check the transfer memory 120 to see if any settings have been changed by the controller (e.g., the transfer memory 120 may include a flag that is set when new settings are written and reset when the settings are read out to the internal memory 110) and, if so, applies the settings then re-writes the transfer memory 120 with the latest settings and readings of the controlled device.

The controller 104 may be any suitable device with a user interface and NFC communication capabilities that is usable to control the controlled device 102. As a non-limiting example, the controller 104 may be a mobile device, such as a smartphone, tablet, laptop, etc. The controller 104 includes an NFC interface 122 that is configured to establish a communication link with other NFC devices according to the NFC protocol. For example, the NFC interface may allow for the connection of the controller to the wireless port 116 of the controlled device 102 when the controller 104 is brought within close proximity (e.g., into contact with and/or within 1.5 inches) of the controlled device 102. The controller 104 further includes one or more processors 124 configured to execute instructions stored in memory 126. The instructions stored in memory 126 may include instructions for running an operating system 128 (e.g., an ANDROID operating system of a smartphone), which may further support the operation of one or more applications including a virtual control application 130 and, optionally, other applications 132.

The virtual control application 130 may include a graphical user interface (GUI) 132 (e.g., a graphical computer user interface and/or other computer user interface) that implements a virtual control panel for the controlled device. The GUI 132 may be configured to be presented via one or more user interface devices 134 and may be configured to accept input therefrom. For example, the user interface devices 134 may include input devices, such as a touch screen, microphone, trackpad, keyboard, mouse, etc. and/or output devices, such as a touch screen or other display, speaker, etc. In some examples, the user interface devices 134 may include one or more hardware interfaces for interfacing with one or more external input/output devices (e.g., including the example input/output devices described above). A user may interact with the virtual control application 130 (e.g., the GUI 132) via the user interface devices 134. In some examples, at least some fields of the GUI may be blank until the controller is in communication with a controlled device, at which time the readings and/or settings of the controlled device are transferred to the controller (e.g., stored in memory 126) and displayed in the GUI. Once the initial data is displayed, the user may interface with the GUI regardless of the NFC connection with the controlled device. For example, the user may walk away with the controller, disconnecting the NFC connection to the controlled device (e.g., such that the controller is not connected to the controlled device in any wireless or wired manner), then apply/input settings (e.g., to be stored in memory 126), which will be uploaded to the transfer memory of the controlled device upon a next NFC connection with the controlled device (e.g., when the user walks back into close proximity to the controlled device with the controller and reconnects via NFC, the contents of the memory 126 corresponding to the input settings may be transferred to the controlled device via the NFC connection).

The virtual control application 130 may also include communication controls 136, which may include algorithms for controlling the use of NFC interface 122 to communicate with the controlled device. For example, the communication controls 136 may include instructions for triggering the start of communications (e.g., responsive to user request or input of control parameters for upload to the controlled device, the communication controls 136 may trigger NFC interface 122 to start monitoring for NFC connections). In other examples, the communication via NFC may be automatic based on proximity to the controlled device (e.g., the communication controls 136 may be absent, and the virtual control application 130 may be executed while the NFC interface is actively available for communications) and/or user request (e.g., data may be transferred responsive to a user selection in the GUI if the NFC connection is still available). In some examples, the transfer memory 120 may only be powered by the magnetic field generated by the controller responsive to the controller initiating and maintaining an NFC connection. In this way, the controlled device (or portions of the controlled device) may be substantially passive or unpowered until an NFC connection is initiated, at which point the transfer memory 120 and/or related components (e.g., the virtual control module 112) may draw its operating power from the magnetic field generated by the hardware of the controller that provides for the NFC connection (e.g., the NFC interface 122). In other examples, the transfer memory 120 and/or related components of the controlled device may be powered at least in part by a power source and/or power circuitry located within the controlled device (e.g., an internal battery and/or power circuitry connected to an external power source). In any of the above examples, the controlled device may be substantially unpowered or powered down (e.g., only receiving operating power from the NFC connection as described above) while data is input into the transfer memory 120 from the controller. Subsequently, the controlled device may be powered up, which may trigger the data from the transfer memory 120 to be read into the internal memory 110 and executed. For example, as described in more detail below, data input into the transfer memory 120 from the controller may include configurable settings, such that executing the configurable settings that are input into the transfer memory may include changing operation of the controlled device to be in accordance with the configurable settings input into the transfer memory). In this way, the controlled device may receive changes to its operational settings from a controller while in a powered down or unpowered state, then apply the received changes to the operational settings upon a next power up or powered state.

As will be described in more detail below, the virtual control application 130 may be used to receive changes in parameters to control operation of the controlled device and to propagate these changes to the controlled device by accessing the two port memory (transfer memory 120 of the virtual control module 112) via the wireless port 116. The virtual control application 130 may also be used to display current information regarding the controlled device 102 by way of the above-described access to the two port memory of the controlled device. In additional or alternative examples, the controller may enter a reading only mode, in which, responsive to a trigger (e.g., the controller being held in continuous contact with/range of the controlled device) new data is transferred into the controller at the refresh rate of the controlled device, allowing the controller to be a real-time reading device for the controlled device.

In some examples, the virtual control system 100 may optionally include a logger device 103. The logger device 103 may be included in addition to or as an alternative to the controller 104 and may be configured to include at least a subset of the components and/or perform at least a subset of the operations described above with respect to the controller 104. In some examples, the logger device 103 may be detachably coupled to the controlled device 102 and configured to continuously monitor and store readings from the controlled device 102 over time via an NFC connection with the controlled device while coupled to or within communication range of the controlled device. For example, the logger device 103 may communicate with the controlled device 102 via the wireless port 116 in the manner described above with reference to the controller. The stored data may be timestamped based on a transmission or receipt time associated with the monitored data. The monitored data may be displayed locally on the logger device and/or transmitted to a further device via a wired or wireless connection. For example, the logger device 103 may periodically upload the monitored data (e.g., an aggregation and/or collection of monitored data collected over a selected or predetermined period of time) to a server, database, or other device. In some examples, the logger device 103 may communicate with the controller 104 via an NFC connection in order to transfer the monitored data to the controller. Similarly to the example discussed above in reference to the controller, in some examples, the transfer memory 120 may be powered by the magnetic field generated by the logger device. In this way, the controlled device (or portions of the controlled device) may be substantially passive or unpowered until an NFC connection is initiated via the logger device 103.

Figure 2A:
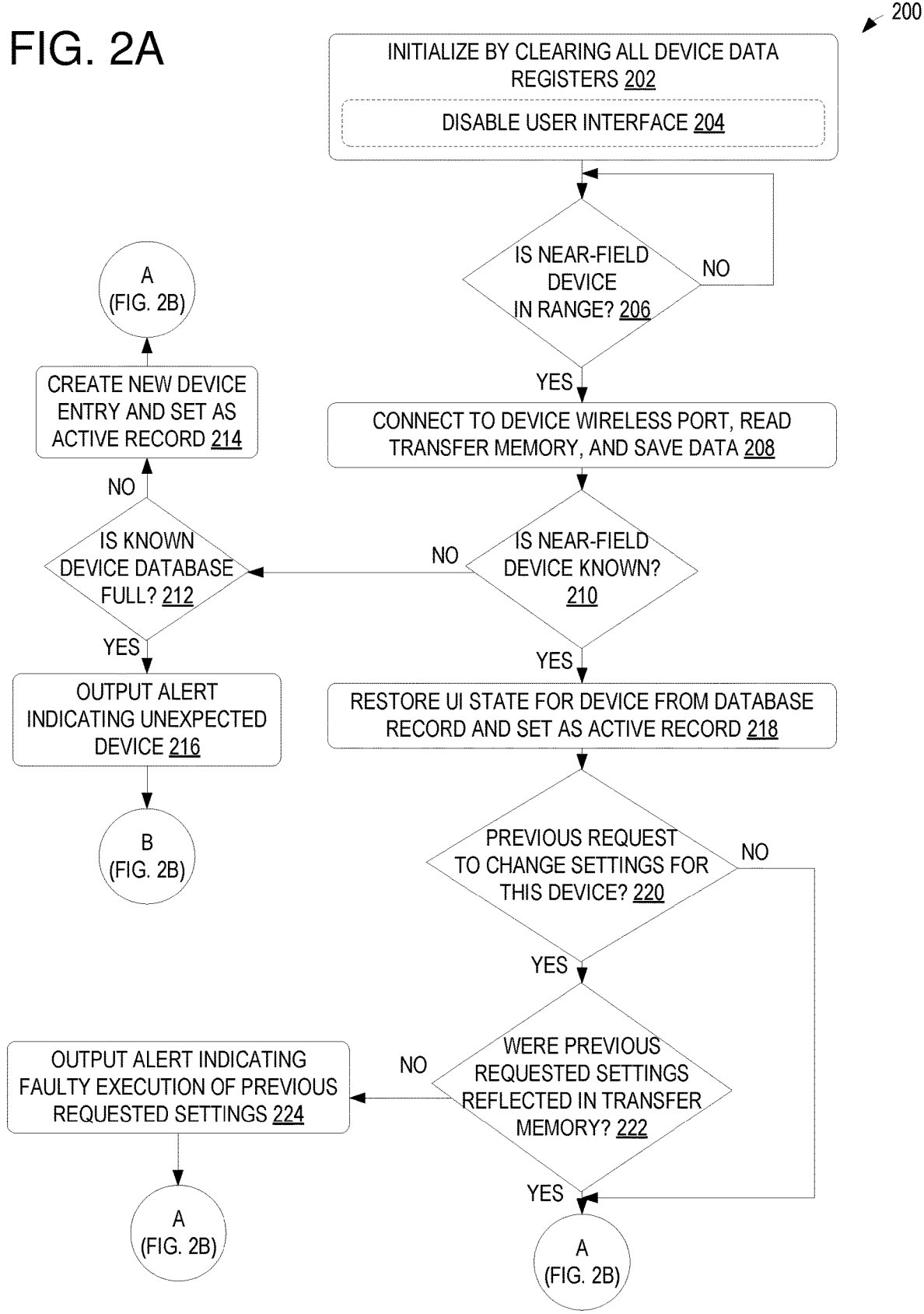
FIGS. 2A and 2B show a flow chart of an example method of controlling a near-field device using a controller.
Figure 2B:
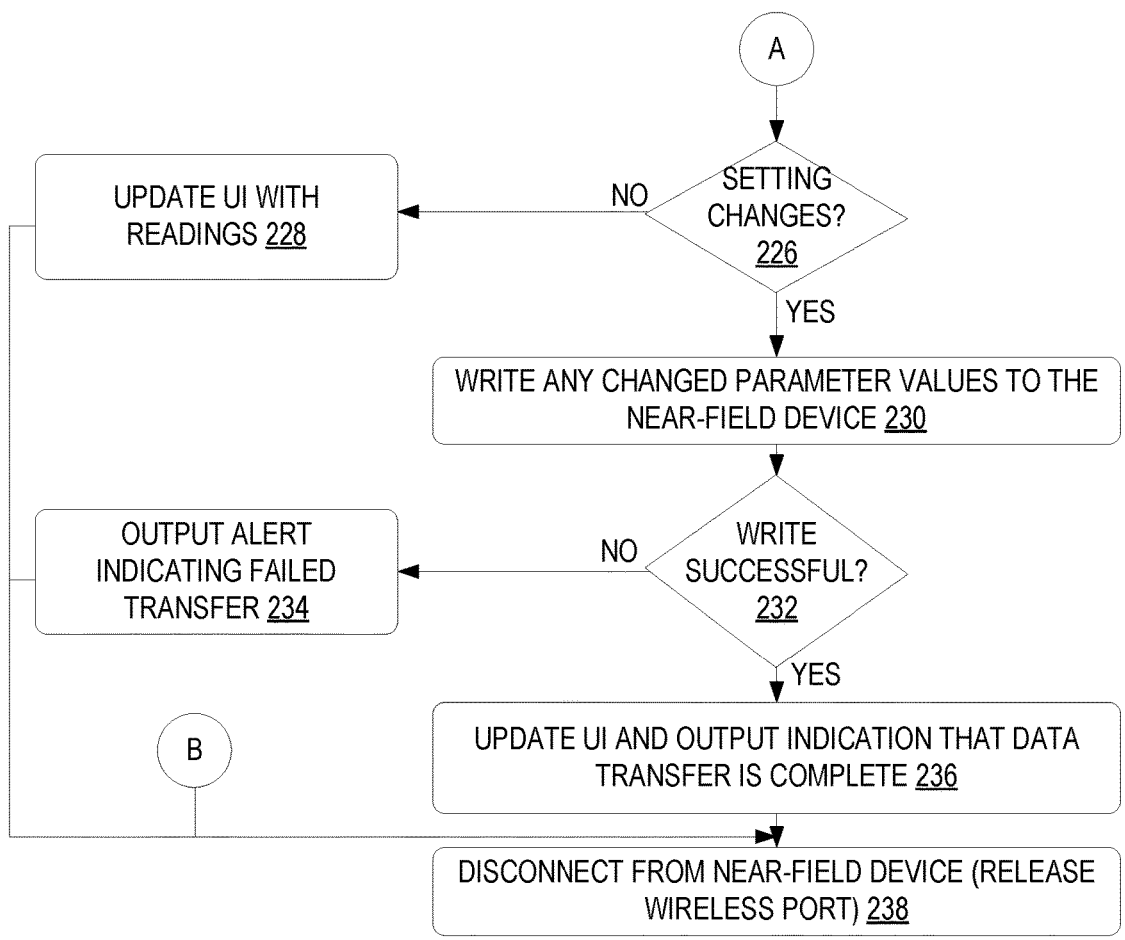

FIGS. 2A and 2B show a flow chart of an example method 200 for operating a controller, such as controller 104 of FIG. 1, to control and interface with a near-field (e.g., controlled) device, such as controlled device 102 of FIG. 1. At 202, the method includes initializing the controller by clearing all device data registers relating to the controlled device. For example, the device data registers may include locations in the memory of the controller (e.g., memory 126 of FIG. 1) configured to store data that is received from the controlled device and/or transmitted to the controlled device. As indicated at 204, the initialization may optionally include disabling the user interface to prevent interim settings changes.

At 206, the method includes determining if a near-field device is in range of the controller. As described above, the described devices utilize NFC, so the range may be set by the NFC protocol (e.g., antennas may be considered in range if approximately 1.5 inches or less apart). If no near-field device is in range, the method returns to keep checking for in-range devices. If a near-field device is determined to be in range, the method includes connecting to the near-field device's wireless port, reading a transfer memory of the near-field device, and saving the data from the transfer memory at the controller, as indicated at 208.

At 210, the method includes determining if the near-field device is a known device. For example, the method may include checking a database of known devices (stored locally on the controller or in a centralized database accessible via, for example, a network such as the Internet) to determine if the device is known. Information acquired during connection with the near-field device, such as identifier information, transfer memory data, and/or other information may be used to check the database as described above. If the near-field device is not known, the method may include determining if the known database is full, as indicated at 212. If the known database is full (e.g., and it is not possible to clear data to make room in the database for additional entries), the near-field device is rejected and an alert is output indicating that a connection was made to an unexpected device, as indicated at 216, and the method proceeds to 238 (shown in FIG. 2B) to disconnect from the near-field device (e.g., without propagating any settings changes, and saving any settings changes as pending until a connection is made with the correct near-field device).

If the database is not full (e.g., or if it is possible to clear data to make room in the database for additional entries), a new entry is created in the database for the near-field device and that entry is set as an active record for the current connection. The method then proceeds to check for settings changes as indicated at 226 and described in more detail below.

Returning to 210, if the near-field device is known, the method includes restoring a user interface state of the controller for the near-field device based on the database record for the device and set the database record as an active record for the current connection. For example, the user interface may be updated to show device information for the near-field device, which may include last-known settings and/or readings for the device.

At 220, the method includes determining if there was a previous request to change settings for the near-field device (e.g., if the controller connected to the near-field device previously and transferred settings changes thereto). If there was a previous request to change settings for the near-field device, the method includes determining if the previous requested settings are reflected in the transfer memory, as indicated at 222. For example, a record of the previous requested settings may be saved until confirmed as reflected by the controlled device (e.g., determined to be received back in a subsequent connection, for example, by comparing the previous requested settings to the data read at 208). If the previous requested settings are not reflected in the transfer memory, the method includes outputting an alert indicating faulty execution of the previous requested settings, as indicated at 224. If the previous requested settings are reflected in the transfer memory, if there was no previous request to change settings, or once the alert at 224 is output, the method proceeds to 226, shown in FIG. 2B.

At 226, the method includes determining if any settings changes are detected. For example, settings changes may include changes to operational settings for a controlled device as issued via user input made to the controller from within a virtual control application. In other examples, the changes to operational settings may be made automatically by the controller (e.g., the virtual control application) based on an automated routine. In some examples, a flag or other indicator may be used to track when a user inputs settings changes to be applied to the controlled device, and the flag or other indicator may be cleared once the settings changes are successfully transferred to the controlled device. If no settings changes are detected, the method includes enabling the user interface (if not already enabled, as the user interface may alternatively be enabled at 214, 218, or 224, for example) and updating the user interface with the readings from the transfer memory (e.g., collected at 208), as indicated at 228. The method then proceeds to disconnect from the near-field device (e.g., by releasing the wireless port of the near-field device), as indicated at 238.

If settings changes are detected at 226, the method includes writing any changed parameter values to the near-field device, as indicated at 230. The method further includes determining, at 232, if the write was successful. If the write was not successful, the method proceeds to 234 to output an alert indicating that the write failed, and then proceeds to 238 to disconnect from the near-field device, saving the settings changes for a next connection with the near-field device.

If the write is determined to be successful at 232, the method includes updating the user interface and outputting an indication that the data transfer is complete, as indicated at 236. As indicated at 238, the method further includes disconnecting from the near-field device by releasing the wireless port of the controlled device. The method may subsequently include returning to 206 to check whether a near-field device is in range.

Figure 3:
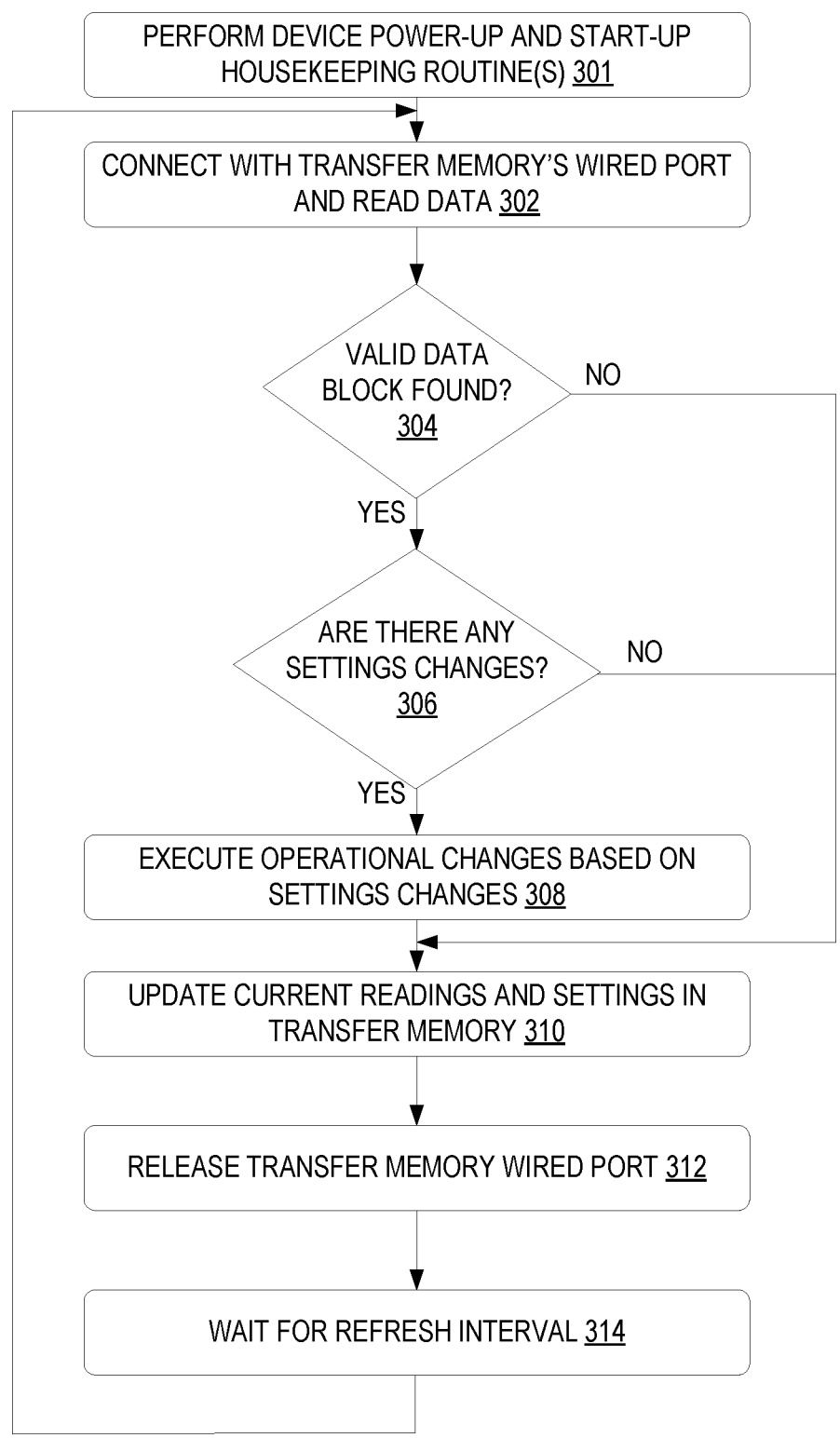
FIG. 3 is a flow chart of an example method of updating operations and/or settings in a controlled device responsive to interactions with a controller via a near-field communications connection.

FIG. 3 shows an example method 300 for updating operations of a controlled device based on interfacing with a controller. For example, method 300 may be performed by the controlled device 102 of FIG. 1 in association with communications with controller 104 of FIG. 1. At 301, the method includes performing a device power-up and start-up housekeeping routine(s) for the controlled device. For example, the start-up housekeeping routines may include initializing hardware components of the controlled device, cleaning up cached memory, and/or other operations performed upon waking up and/or powering up the controlled device.

At 302, the method includes connecting with a transfer memory's wired port (e.g., transfer memory 120 of FIG. 1) and reading the data from the transfer memory. For example, the data from the transfer memory 120 may be read into the internal memory 110 via the wired port 118 and/or otherwise analyzed by processors 108 of the controlled device 102 of FIG. 1. The read data may be processed to determine if a valid data block is present, as indicated at 304. For example, a valid data block may include a data block storing valid data relating to parameter data for the controlled device (e.g., readings and/or settings).

If a valid data block is found (e.g., "YES" at 304), the method includes determining if there are any settings changes (e.g., in the data block), as indicated at 306. For example, the values of the settings from the transfer memory may be compared to current corresponding settings values to determine if there are any changes. Changes in the settings values may indicate that a controller has provided updated settings to control the controlled device to change operation and/or operating settings. If there are settings changes, the method includes executing the operational changes based on the settings changes, as indicated at 308. For example, operation of the controlled device may be adjusted to operate according to the settings as defined in the transfer memory.

Once the settings changes are executed, or if there are no settings changes (e.g., "NO" at 306) and/or if no valid data block was found at 304 (e.g., "NO" at 304), the method includes updating current readings and settings in the transfer memory, as indicated at 310. For example, the updated settings (if applicable) and any current readings generated by the controlled device may be written (e.g., as a data block) to the transfer memory (e.g., via the wired port). Upon writing the data to the transfer memory, the method includes releasing the transfer memory wired port, as indicated at 312. The method further includes waiting for the next refresh interval, as indicated at 314, and, during the next refresh interval, returning to 302 to connect to and read the data blocks of the transfer memory.

Figure 4A:
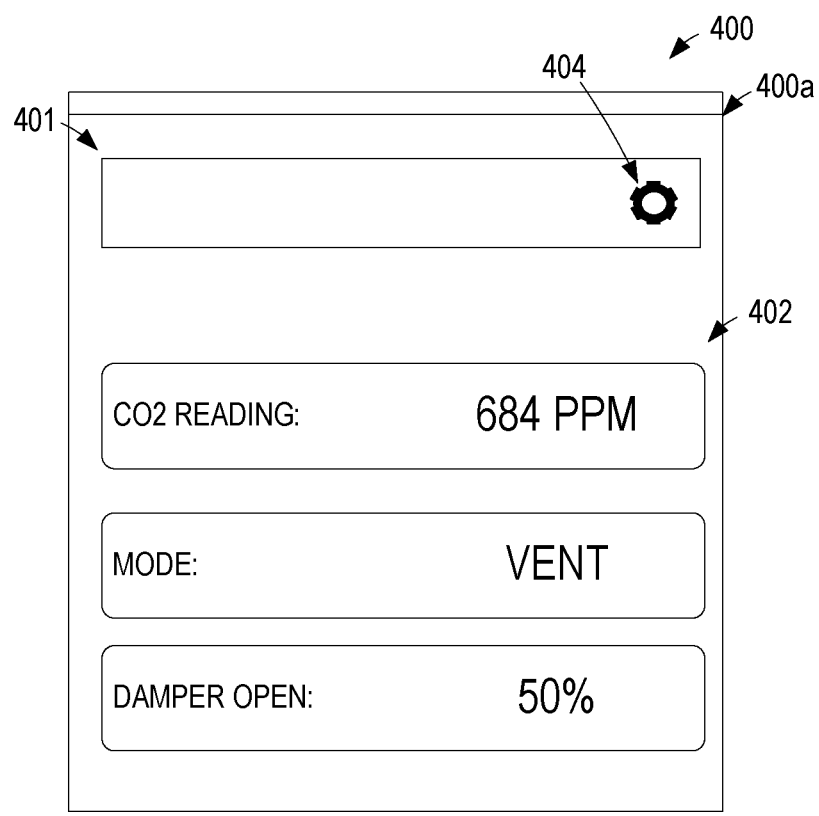
FIGS. 4A-4C show example user interfaces for a controller application executing on a mobile device.
Figure 4B:
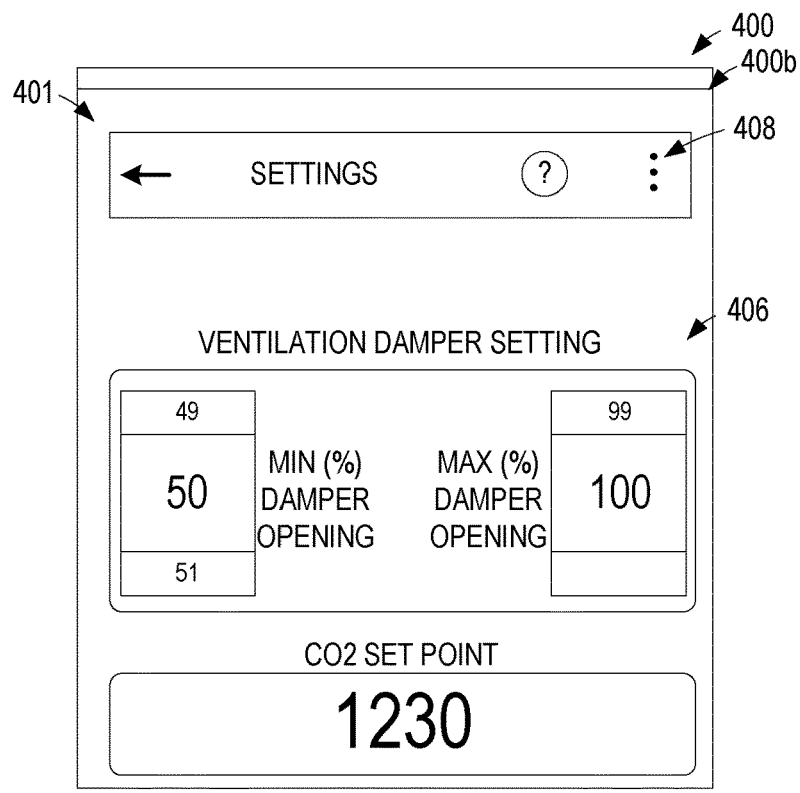
Figure 4C:
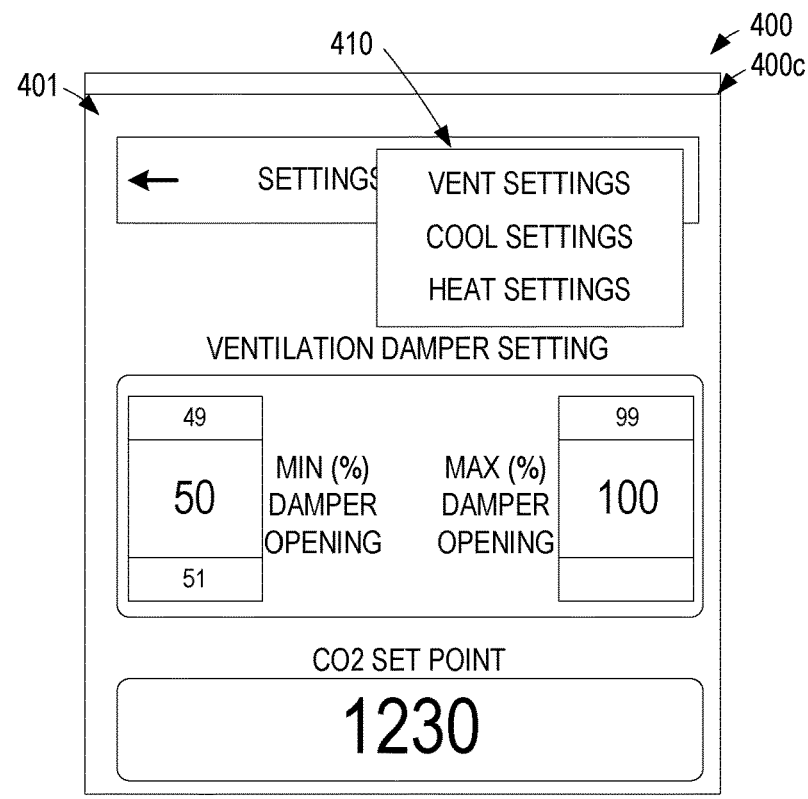

FIGS. 4A-4C show different states (400a-400c, respectively) of a graphical user interface that may be displayed on a controller 400 to enable a user to control and interface with a controlled device remotely via NFC communications. For example, controller 400 may be an example of controller 104 of FIG. 1, and the graphical user interface of controller 400 may be used to implement a virtual control panel for a controlled device, such as controlled device 102 of FIG. 1.

FIG. 4A shows a first state 400a of the graphical user interface (e.g., a GUI of a virtual control application executing on the controller 400, such as GUI 132 of FIG. 1) including a virtual control panel 401 in a first example state, in which current or latest readings of a controlled device are presented at 402. For example, the readings include a current or latest measurement provided by the controlled device (e.g., a CO2 reading in the illustrated example), a current mode or state of the controlled device, and a current setting of the controlled device. The current setting may be user-changeable by selecting a settings user interface element 404.

Selecting the settings user interface element 404 may cause the GUI to enter a settings state, an example of which is shown in FIG. 4B by state 404b of the GUI including the virtual control panel 401 in a second example state. In state 404b, a first set of settings 406 that are able to be adjusted via user input (e.g., ventilation damper settings including a minimum and maximum damper opening, and a CO2 set point in the illustrated example) are shown and are configured to be interacted with via user interface devices of the controller (e.g., a user may select a configurable setting and enter or perform a gesture to change a value of the setting). In order to see other configurable settings, a user interface element 408 may be selected, resulting in the state of the GUI shown at 400c in FIG. 4C, including the virtual control panel 401 in a third example state. For example, the GUI of FIG. 4C includes a window 410 showing different types of settings that can be adjusted, which may be accessed by selecting the different types (e.g., vent settings, cool settings, and heat settings, in the illustrated example). It is to be understood that the features and settings of the GUI shown in FIGS. 4A-4C is illustrative and other user interfaces may be used to perform the user input/output-based controller operations described above.

Figure 5:
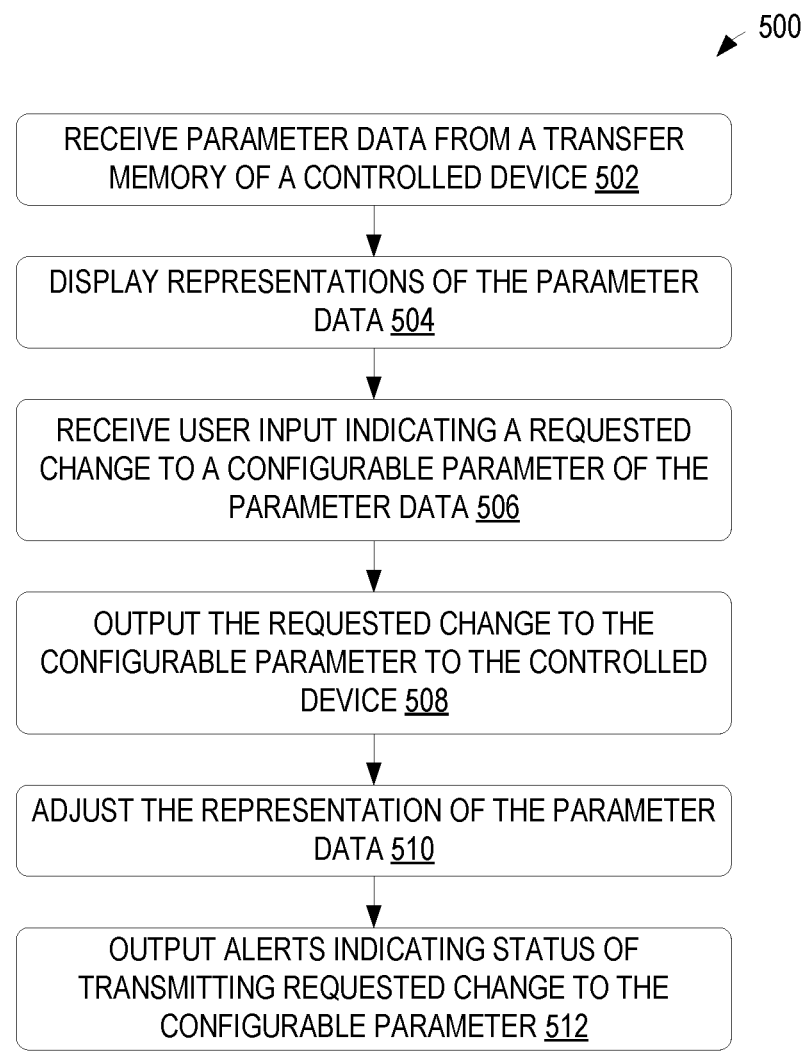
FIG. 5 is a flow chart of an example method of operating a user interface on a controller to effect changes in a controlled device that is in communication with the controller over a near-field communications connection.

FIG. 5 is a flow chart of an example method 500 of operating a user interface to interface with a controlled device using a controller. For example, method 500 may be performed via a GUI, such as GUI 132 of FIG. 1, presented via an application executing on a controller, such as controller 104 of FIG. 1 to control a controlled device, such as controlled device 102 of FIG. 1.

At 502, the method includes receiving parameter data from a transfer memory of a controlled device. For example, the parameter data may include one or more configurable parameters (e.g., parameters controlling operation of the controlled device) and/or current status or measurement data (e.g., parameters indicating an operating status of the controlled device, parameters indicating latest measurements made by the controlled device, and/or other parameters that may dynamically change and/or affect operation of the controlled device).

At 504, the method includes displaying representations of the parameter data. For example, as shown in FIG. 4A, an indication of the status/mode of the controlled device, a current setting of configurable parameters, and a current/latest measurement of a measured parameter are shown in the user interface.

At 506, the method includes receiving user input indicating a requested change to a configurable parameter of the parameter data. For example, as shown in FIG. 4B, configurable parameters may be displayed within an interactable user interface element that allows users to adjust the configurable parameter. At 508, the method includes outputting the requested change to the configurable parameter to the controlled device in order to adjust the operation of the controlled device to be in accordance with the requested change.

At 510, the method includes adjusting the representation of the parameter data to indicate the requested change of the at least one configurable parameter. In some examples, this adjustment may be made in real-time as a user provides input to adjust the parameter. In other examples, the real-time adjustment may be indicated in one portion of the user interface, while another portion of the user interface shows the adjustment only once it has been successfully transmitted to the controlled device.

As indicated at 512, the method may further include outputting alerts indicating the status of transmitting the requested change to the configurable parameter. It is to be understood that the alerts may be output at a time that is relevant to the transmission status. For example, an alert indicating a failed transmission may occur after outputting the requested change at 508 if the output is unsuccessful. As another example, an alert indicating that a connected device is not the same as the controlled device to which the requested change relates may be output before outputting the requested change in the event an NFC connection is made to a device that is not the controlled device from which data is received at 502. As still another example, an alert indicating a successful transmission of the requested change may be output after successfully outputting the requested change at 508.

Example Computing Systems

Figure 6:
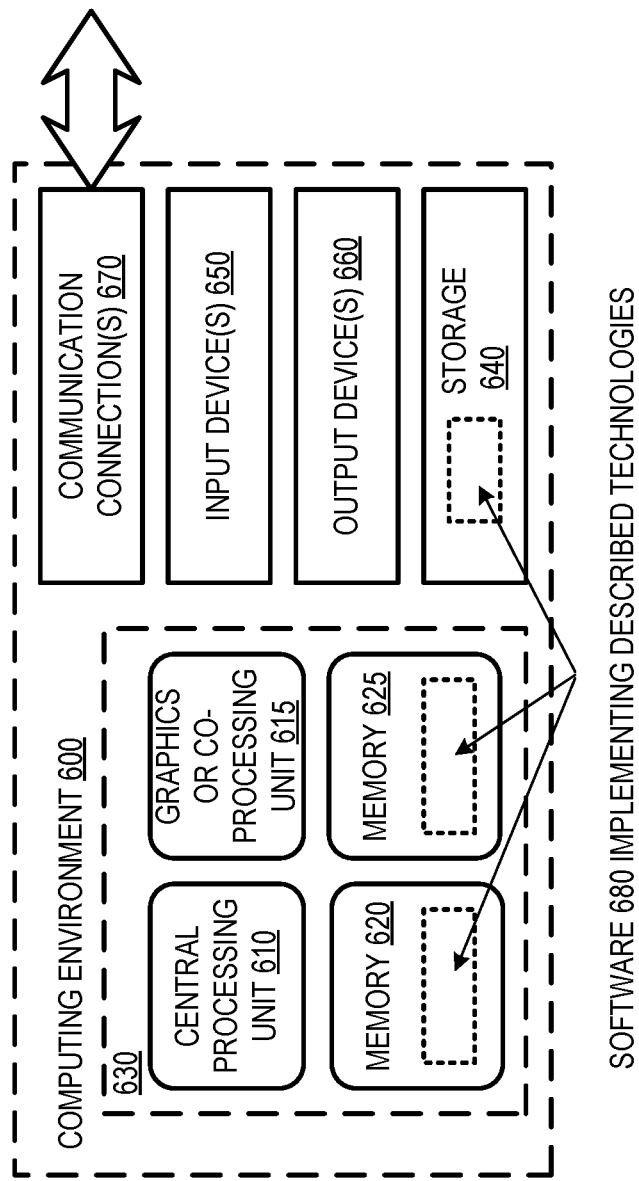
FIG. 6 depicts a generalized example of a suitable computing environment in which the described innovations may be implemented.

FIG. 6 depicts an example of a suitable computing system 600 in which the described innovations can be implemented. For example, the controlled device 102 and/or controller 104 of FIG. 1 may be implemented by and/or within one or more computing systems such as computing system 600. The computing system 600 is not intended to suggest any limitation as to scope of use or functionality of the present disclosure, as the innovations can be implemented in diverse computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 can be volatile memory (e.g., registers, cache, RAM), non-volatile memory (e.g., ROM, EEPROM, flash memory, etc.), or some combination of the two, accessible by the processing unit(s) 610, 615. The memory 620, 625 stores software 680 implementing one or more innovations described herein, in the form of computer-executable instructions suitable for execution by the processing unit(s) 610, 615.

A computing system 600 can have additional features. For example, the computing system 600 includes storage 640, one or more input devices 650, one or more output devices 660, and one or more communication connections 670, including input devices, output devices, and communication connections for interacting with a user. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 can be removable or non-removable, and includes magnetic disks, magnetic tapes or cassettes, CD-ROMs, DVDs, or any other medium which can be used to store information in a non-transitory way and which can be accessed within the computing system 600. The storage 640 stores instructions for the software 680 implementing one or more innovations described herein.

The input device(s) 650 can be an input device such as a keyboard, mouse, pen, or trackball, a voice input device, a scanning device, touch device (e.g., touchpad, display, or the like) or another device that provides input to the computing system 600. The output device(s) 660 can be a display, printer, speaker, CD-writer, or another device that provides output from the computing system 600. For example, the user interface device(s) 128 may be used to interface with the virtual control application 132 to allow a user to control the controlled device 102 via the controller 102 of FIG. 1.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF (e.g., NFC), or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing system to perform the method. The technologies described herein can be implemented in a variety of programming languages.

Example—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

Example—Example Advantages

The technologies disclosed herein offer multiple advantages. For example, because the controller operates as a virtual control panel, it is unnecessary to integrate controls onto the controlled device itself. This reduces costs, as the necessary parts and equipment can be omitted from the controlled device, being transferred instead to the controller. A single controller can be used to control any number of controlled devices.

Furthermore, separating the control panel from the controlled device has security and privacy advantages, as the parameter status values are obtainable only via close physical proximity to the controller, access to which can be limited or restricted. Because the transfer of data between the controller and controlled device is accomplished via an NFC channel, it is not necessary to establish (or provide hardware and software for), internet, telephonic or other long-range communication. This provides advantages in terms of security, as communications cannot be intercepted easily, and further permits operation in settings (such as in remote areas) in which such long-range communications cannot be established due to lack of available equipment or power. When the controller and controlled device are both battery powered, it is not even necessary to provide an external power supply.

Further Examples

In one example, a method for virtual control of a controlled device, which includes using a controller comprises establishing a near-field communication channel between the controller and the controlled device via NFC circuitry, wherein the controlled device has a controlled device processor, one or more functional components under operational control of the controlled device processor, and a communications module that includes NFC circuitry, a communications port connected to a controlled device processor and transfer memory being asynchronously readable and writable via the NFC circuitry and the communications port transmitting data between transfer memory, transmitting data between the transfer memory and the controlled device processor via the communications port and between the transfer memory and the controller via the near field communication channel, the transmission of data in each case being bidirectional and the transmission of data between the transfer memory and controlled device processor being performed asynchronously with the transmission of data between the transfer memory and the controller, and adjusting the operation of at least one functional component under operational control of the controlled device processor in response to data transmitted to the transfer memory by the controller.

In another example, a method for virtual control of a controlled device using a controller, wherein the controlled device has a controlled device processor, one or more functional components under operational control of the controlled device processor; and a communications module that includes NFC circuitry, a communications port connected to a controlled device processor and transfer memory being asynchronously readable and writable via the NFC circuitry and the communications port; comprises the steps of I) establishing a near field communication channel between the controller and the controlled device via the NFC circuitry, II) transmitting data between the transfer memory and the controlled device processor via the communications port and between the transfer memory and the controller via the near field communication channel, the transmission of data in each case being bidirectional and the transmission of data between the transfer memory and controlled device processor being performed asynchronously with the transmission of data between the transfer memory and the controller and III) adjusting the operation of at least one functional component under operational control of the controlled device processor in response to data transmitted to the transfer memory by the controller.

In still another example, a method for virtual control of a controlled device using a controller, wherein the controlled device has a controlled device processor, one or more functional components under operational control of the controlled device processor, and a communications module that includes NFC circuitry, a communications port connected to a controlled device processor and transfer memory being asynchronously readable and writable via the NFC circuitry and the communications port; and further wherein the controller has a graphical user interface (GUI) and/or auditory user interface (AUI), a bi-directional near field communications module and computer means adapted to receive parameter status values from the controlled device via a near field communication channel, report at least one such parameter status value in human-perceivable form via the GUI and/or AUI, receive modifications to at least one parameter status value inputted via the GUI and/or AUI and transmit a modified set of parameter status values to the controlled device via the near field communication channel, comprises the steps of: A) writing a set of parameter status values from the controlled device processor to the transfer memory of the NFC circuitry; B) then establishing a near field communication channel between the controller and the controlled device, C) transmitting the set of parameter status values from the transfer memory to the controller via the near field communication channel; D) reporting at least a portion of the transmitted parameter status values in human-perceivable form via the GUI and or AUI of the controller; E) modifying at least one parameter status value by inputting at least one parameter change value to the controller via the GUI and/or AUI, to produce a modified set of parameter status values; F) transmitting the modified set of parameter status values to the transfer memory via the near field communication channel; G) writing the modified set of parameter status values from the transfer memory to the controlled device processor; and H) adjusting the operation of at least one functional component under operational control of the controlled device processor in response to the modified set of parameter values.

In example methods of the disclosure, a controlled device and a controller cooperate using near-field communications (NFC).

In some examples, the controlled device processor stores a set of parameter status values in its writable memory and, in accordance with its programming, controls operation of at least one mechanical component or electrical control output of the controlled device. As used herein, parameter status value or parameter data may refer to a value or data that indicates (i) a measurement made by the controlled device and/or another device that makes the measurement and reports the resulting value to the controlled device, and/or (ii) an operational status of the controlled device or some functional component of the controlled device. A status value in general can be any datum that is significant to the function, control, status and/or operation of the controlled device. Examples of status values may include, for example, measured atmospheric conditions such as temperature, pressure and relative humidity; time; fluid flow rates; measurements made by one or more analytical devices (such as, for example, a carbon dioxide sensor, carbon monoxide sensor or other sensor, smoke detector, among many others); the operational status of one or more functional components of the controlled device (such as "on", "off", "open", "closed" or a more precise indicator of position within a range of motion). As will be appreciated, status values can range very widely and will depend on the purpose and function of the controlled device.

The functional component of the controlled device is, in some examples, a component that (1) performs all or part of the function of the controlled device and/or (2) performs a measurement made by the controlled device. In some examples, the functional component is or includes a mechanical or electromechanical device. Similarly, a wide range of functional components mechanical or electromechanical components is useful. All that is required is that the component produce some motion or perform some other function in response to a control signal generated by the controlled device. The mechanical and/or electromechanical component may be, for example, a switch; a lock; a motor which produces some movement of a physical entity (such as a door, a baffle, a valve among many others); a hydraulic system; a blower or fan; or many others).

One of the functions of the controlled device might be to generate an electric control signal input to some other process such as a building HVAC control system to which the output of the controlled device is just one of multiple inputs used by the building control system to adjust multiple mechanical devices (such as valves, dampers, fans, etc.) to control the building. At least one functional component of the controlled device is under operational control of a controlled device processor. Typically, a controlled device processor is programmed to operate at least one functional component in response to the set of parameter status values. The controlled device includes near field communications (NFC) circuitry, which includes an antenna and circuitry adapted to inductively couple to another NFC device, in particular the controller. The NFC circuitry is adapted to establish a NFC channel with the controller and to communicate bi-directionally with the controller through the NFC channel. The NFC circuitry may be a type 4 NFC tag adapted to communicate with the controller using a frequency of 13.56 MHz in the globally available unlicensed radio frequency ISM band using the ISO/IEC 18000-3 air interface standard. The controlled device also includes readable and writable memory (referred to herein as "transfer memory") which can be written to and read by the each of controlled device processor and the controller.

The transfer memory is read and written to by one or more controlled device processors via a communications port to which the controlled device processor is in electric communication, such that parameter status values can be read from the transfer memory and written to the transfer memory by the controlled device processor(s). Accordingly, the transfer memory is in electrical communication with the communications port such that parameter status values can be read from the transfer memory and written to the transfer memory by one or more controlled device processors via one or more communications ports. The communications port may be a wire port to which the controlled device processor is connected. The transfer memory is read and written to by the controller via an NFC channel established with the controller via the NFC circuitry of the controlled device. Accordingly, the transfer memory is in electrical communication with the NFC circuitry such that parameter status values can be read from the transfer memory and written to the transfer memory by the controller via the NFC channel established using the NFC circuitry of the controlled device (and of the controller).

The NFC port and communications port to the controlled device processor operate asynchronously, i.e., data transfer (in either direction, to or from the transfer memory) can occur through only one of the ports at any given time. Thus, the transfer memory can be read and/or written to by either the controller or the controlled device processor at any point in time, but not by both. During times at which the transfer memory is being read or being written to by either the controller, it cannot be read or written to the controlled device processor, and vice versa.

The NFC circuitry may be a so-called "NFC tag" which is passive electronic circuitry that includes the NFC circuitry and antenna, readable and writable memory which can serve as the transfer memory and a wire port that serves as the communications port to the controlled device processor. The NFC circuitry may, if desired, be integrated into the controlled device processor.

The controller includes a GUI or AUI, or both. The GUI or AUI, as the case may be are adapted to report one or more parameter status values read from the transfer memory of the controlled device in human-perceivable form. By "report" it is meant that the GUI or AUI generates a visual display or auditory signal, perceivable by a human, indicative of the parameter status value or values. Typically, the controller will include a GUI and a visual display. The controller is also adapted to receive inputs from a human user via, for example, a touchscreen, keyboard, auditory input (i.e., a spoken command) and the like. The controller further includes a bi-directional NFC module and computer means adapted to receive parameter status values from the controlled device via a near field communication channel, display at least one such parameter status value on the GUI and/or AUI, receive modifications to at least one parameter status value inputted via the GUI and/or AUI and transmit a modified set of parameter status values to the controlled device via a near field communication channel.

The controller can be a dedicated device or a general purpose device that is programmed to perform the required operations, i.e., receiving parameter status values from the controlled device via a near field communication channel, reporting at least one such parameter status value on the GUI and/or AUI, receiving modifications to at least one parameter status value inputted via the GUI and/or AUI and transmitting the modified set of parameter status values to the controlled device via the near field communication channel. A cellular telephone equipped with the NFC module and programming is entirely suitable.

In a broad aspect, an example method includes the steps of: I) establishing a near field communication channel between the controller and the controlled device via the NFC circuitry, II) transmitting data between the transfer memory and the controlled device processor via the communications port and between the transfer memory and the controller via the near field communication channel, the transmission of data in each case being bidirectional and the transmission of data between the transfer memory and controlled device processor being performed asynchronously with the transmission of data between the transfer memory and the controller and III) adjusting the operation of at least one functional component under operational control of the controlled device processor in response to data transmitted to the transfer memory by the controller.

In some examples, a method includes a step of A) writing a set of parameter status values from the controlled device processor to the transfer memory. The controlled device processor may be programmed to periodically read and write to the transfer memory. The method may include a subsequent step of B) establishing a near field communication channel between the controller and the controlled device. Because NFC operates over a short physical distance, the NFC channel may be established by powering the NFC module in the controller and bringing the NFC module of the controller into close physical proximity (typically with 10 cm or less) to the NFC circuitry of the controlled device. The NFC channel typically becomes established automatically.

Upon establishment of the NFC channel, the method may include a step C) of transmitting the set of parameter status values from the transfer memory to the controller via the near field communication channel. This is performed asynchronously with step A) as well as asynchronously with subsequent step F). At least a portion of the transferred set of parameter status values are then (step D)) reported via the GUI and/or AUI of the controller.

In step E, at least one parameter status value is modified by inputting at least one parameter change value to the controller via the GUI, to produce a modified set of parameter status values. Most typically, the parameter change value represents a command to make a change to an operational status of the controlled device or some functional component of the controlled device. A simple example of such a changed parameter status value would be to change the operation of a functional component from "off" to "on". Another example is a change in the operational status of the functional component, such as changing the temperature setting on a thermostat.

In step F), the modified set of parameter status values are transferred from the controller to the transfer memory via the near field communication channel. This step is performed asynchronously with steps A) and C). Subsequently in step G), the modified set of parameter status values are written to the controlled device processor from the transfer memory.

The operation of at least one functional component under operational control of the controlled device processor is then adjusted (step H)) in response to the modified set of parameter values. Typically, this is performed in accordance with the programming of the controlled device program, but the adjustment may simply implement a command included in the modified set of parameter status values. The NFC channel may if desired be disconnected after performing step C) and before step F). In such a case, the NFC channel must be re-established before performing step F).

In a detailed, illustrative, and non-limiting example, a computer-controlled air handling system includes a processor, a carbon dioxide ($CO_2$) sensor, and a damper that controls the flow of air through at least one portion of the handling system. The damper is controlled via an electrical signal from the processor, and circuitry reports the position of the damper to the processor. The $CO_2$ sensor continuously or periodically monitors the $CO_2$ concentration in the atmosphere of an enclosed area served by the air handling system. The processor is programmed to compare the measured $CO_2$ concentration with a minimum $CO_2$ set point and with a maximum $CO_2$ set point. The process is further programmed to produce a signal to the damper to adjust the position of the damper between a minimum open position (when the measured $CO_2$ concentration is at or below the minimum set point), to a maximum open position (when the measured $CO_2$ concentration is at or above the maximum set point), and intermediate open positions when the measured $CO_2$ concentration is between the minimum and maximum $CO_2$ set points. The intermediate open positions vary linearly between the minimum and maximum open positions with measured $CO_2$ concentrations between the set points.

The controlled device processor generates a set of parameter status values that include: a) minimum $CO_2$ set point=1300 ppm; b) maximum $CO_2$ set point=2300 ppm; c) measured $CO_2$ concentration of 1800 ppm; and d) damper position half-way between the minimum and maximum open positions.

The controlled device includes a type 4 NFC tag that includes passive NFC circuitry, transfer memory and a wire port that is in electrical communication with the controlled device processor. The controlled device processor periodically writes the set of parameter status values to the transfer memory. The controller is an NFC-enabled Android cellular telephone with an installed application that reads the set of parameter status values from the transfer memory when an NFC channel has been established with the controlled device; displays the set of parameter status values on the telephone display; permits inputted changes to be made to the set of parameter status values to produce a modified set of parameter status values; and writes the modified set of parameter status values to the transfer memory (again, when an NFC channel has been established).

An operator establishes an NFC channel between the controller and controlled device by bringing the controller into close proximity to the NFC circuitry of the controlled device. Using a protocol similar to that described in FIG. 1, the controller reads the set of parameter status values from the transfer memory and displays them on the telephone display.

The operator then makes one or more adjustments to one or more of the parameter status values via the GUI, using the touchscreen feature of the telephone display to make the inputs. Inasmuch as the measured CO2 concentration is a measured value, the possible inputs in this example are changes to either or both of the minimum CO2 and maximum CO2 settings, or to the damper position (in effect overriding the programming of the controlled device processor.

The operator changes this maximum CO2 setting from 2300 to 1800. This creates a modified set of parameter input values as follows: a) minimum CO2 set point=1300 ppm; b) maximum CO2 set point=1800 ppm; c) measured CO2 concentration of 1800 ppm; and d) damper position at half-way between the minimum and maximum open positions.

Note that in this example, the damper position parameter has not changed at this point even though it is to be adjusted to the maximum open position in response to the maximum CO2 set point being specified at the same value as the measured CO2 concentration. The calculation of the damper position can be made by the controller, if so programmed, and/or by the controlled device processor. In this example, the calculation is performed by the controlled device processor, so at this point the damper position in the modified set of parameter status values remains unchanged.

The NFC channel is then reestablished if necessary and the controller writes the modified set of parameter input values to the transfer memory, after which the NFC channel can be disconnected. The controlled device processor then reads the modified set of parameter input values from the transfer memory, calculates a new damper position at the maximum open position, and sends a signal to the damper which causes a damper motor to become actuated and move the damper into the maximum open position. The controlled device processor then creates a new set of parameter status values that reflect the minimum and maximum CO2 set points, the measured CO2 concentration and new damper position (maximum open). The controlled device processor thereafter writes the new set of parameter status values to the transfer memory.

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method of executing a user interface on a controller to provide a virtual control panel for a first controlled device, the method comprising:
   receiving, via a near-field communication (NFC) connection, parameter data from a transfer memory of the first controlled device, the parameter data including one or more configurable parameters of the first controlled device and current status or measurement data;
   displaying, via the user interface, representations of the parameter data;
   receiving, via the user interface, user input indicating a requested change of at least one of the configurable parameters;
   outputting, to the first controlled device via the NFC connection, the requested change of the at least one configurable parameter to be implemented at the first controlled device to update operation of the first controlled device; and
   updating the user interface to display an indication of the requested change of the at least one configurable parameter,
   wherein, prior to outputting the requested change of the at least one configurable parameter, determining that the controller is connected to a second, different controlled device and, in response, displaying an alert and storing the requested change of the at least one configurable parameter without transmitting the requested change until the controller connects to the first controlled device via the NFC connection.

2. The method of claim 1, further comprising, responsive to detecting that the output requested change of the at least one configurable parameter was not written to the transfer memory of the first controlled device, displaying an alert and storing the requested change of the at least one configurable parameter for subsequent outputting to the first controlled device.

3. The method of claim 1, wherein the user input indicating the requested change of the at least one configurable parameter is received while the controller is not connected to the first controlled device via the NFC connection.

4. The method of claim 3, wherein the requested change of the at least one parameter is output to the controlled device during a next connection to the first controlled device via the NFC connection after the user input is received.

5. The method of claim 1, wherein the user interface is continuously updated to display the current status or measurement data in real-time while the controller remains connected to the first controlled device via the NFC connection.

6. The method of claim 1, wherein the NFC connection to the controller is a first NFC connection using a wireless port of the first controlled device, and wherein the current status or measurement data is further transferred to a logger device continuously over a period of time via a second NFC connection using the wireless port of the first controlled device, the status or measurement data being stored at the logger device.

7. The method of claim 1, further comprising displaying, via the user interface, an alert indicating that the requested change of the at least one parameter was successfully written to the transfer memory of the first controlled device.

8. A first controlled device configured to be controlled via a controller implementing a virtual control panel, the first controlled device comprising:
   a virtual control module including a wireless port configured for near-field communications (NFC), a wired port, and a transfer memory configured to store data communicated between the first controlled device and the controller connected via the wireless port;

a processor; and internal memory configured to store parameter data including one or more configurable parameters and current status or measurement data associated with the first controlled device, the internal memory further configured to store instructions executable by the processor to:

connect to the wired port of the virtual control module;

read data in the transfer memory;

determine whether the data in the transfer memory includes changes to at least one of the configurable parameters received from the controller via the wireless port using an NFC connection;

responsive to determining that the transfer memory includes changes to at least one of the configurable parameters, updating the parameter data stored in the internal memory by adjusting the corresponding at least one configurable parameter according to the changes;

write the updated parameter data to the transfer memory; and update operation of the first controlled device corresponding to the changes to the at least one configurable parameter, wherein, the changes to the at least one of the configurable parameters are based on user input to the controller received while the controller is disconnected from the first controlled device, and wherein, responsive to a determination that the controller is connected to a second, different controlled device on a next NFC connection after the user input is received, the changes to the at least one of the configurable parameters are stored at the controller without being transmitted until a next connection to the first controlled device via the wireless port.

9. The first controlled device of claim 8, wherein the transfer memory is powered by a magnetic field generated by the controller to provide the NFC connection, and wherein the first controlled device receives the changes to the at least one configurable parameter from the controller while in a powered down or unpowered state, then applies the received changes to the at least one configurable parameter upon a next power up or powered state of the first controlled device.

10. The first controlled device of claim 8, wherein the instructions are further executable to release the wired port after reading the transfer memory and reconnect to the wired port before writing the updated parameter data to the transfer memory, and wherein the instructions are further executable to release the wired port after writing the updated parameter data to the transfer memory.

11. The first controlled device of claim 8, wherein the first controlled device only connects to the controller using a respective NFC connection.

12. The first controlled device of claim 8, wherein the transfer memory is only accessible by the wired port when the wireless port is in a released state and not in use to provide a communication link via NFC, and wherein the transfer memory is only accessible by the wireless port when the wired port is in a released state and not in use to transfer data with the internal memory.

13. The first controlled device of claim 8, wherein the parameter data stored in the internal memory relates to an operation of a mechanical or electromechanical device included in or in communication with the first controlled device, and wherein updating the operation of the first controlled device includes changing an operational state of the mechanical or electromechanical device.

14. The first controlled device of claim 8, wherein the parameter data includes a measurement that is measured by the first controlled device and a configurable parameter that controls operation of the first controlled device based on the measurement.

15. A controller for providing a virtual control panel for a first controlled device, the controller comprising:

a near-field communications (NFC) interface;

one or more user interface devices; and one or more computer-readable media comprising computer-executable instructions that, when executed by the processing device, cause the controller to:

connect to a wireless port of the first controlled device via an NFC connection established by the NFC interface;

receive parameter data from a transfer memory of the first controlled device via the NFC connection;

determine whether the received parameter data is different from any corresponding controller-stored parameter data for the controlled device, and, responsive to determining that the received parameter data is different, store the received parameter data and update a user interface to present an indication of the received parameters;

determine that user input to the user interface is received via the one or more user interface devices, the user input adjusting the parameter data, and, responsive to determining that the user input is received, store the adjusted parameter data and transmit the adjusted parameter data to the first controlled device via the NFC interface to change one or more corresponding configurable operating parameters of the controlled device; and disconnect from the first controlled device by releasing the wireless port of the controlled device, wherein the computer-executable instructions further cause the controller to, responsive to determining that the controller is connected to a second, different controlled device on a next NFC connection via the NFC interface after the user input is received, maintain storage of the adjusted parameter data without transmitting the adjusted parameter data to the second controlled device and output to the user interface an alert indicating a connection to an unexpected controlled device.

16. The controller of claim 15, wherein the computer-executable instructions further cause the controller to output to the user interface a respective alert responsive to determining that the adjusted parameter data is not transmitted to the first controlled device.

17. The controller of claim 15, wherein the user input is received while disconnected from the first controlled device, and wherein the computer-executable instructions further cause the controller to transmit the adjusted parameter data during a subsequent connection to the first controlled device via the NFC interface, and wherein the adjusted parameter data includes a changed value for a respective one of the one or more corresponding configurable operating parameters of the first controlled device.

18. The controller of claim 15, wherein the computer-executable instructions further cause the controller to disable the user interface while receiving data from the first controlled device via the NFC connection.

\* \* \* \* \*